UNITED STATES PATENT OFFICE.

SMITH W. KIMBLE, OF DENVER, COLORADO, ASSIGNOR TO THE MICA ASBETITE INSULATING COMPANY, OF SAME PLACE.

COMPOSITION OF MATTER FOR INSULATING PURPOSES, &c.

SPECIFICATION forming part of Letters Patent No. 464,369, dated December 1, 1891.

Application filed February 26, 1891. Serial No. 382,871. (Specimens.)

*To all whom it may concern:*

Be it known that I, SMITH W. KIMBLE, a citizen of the United States, and a resident of Denver, county of Arapahoe, State of Colorado, have invented a new and useful Composition of Matter for Insulating Purposes, &c., which composition is fully set forth in the following specification.

This invention relates to the preparation of compositions of matter containing a large proportion of pulverized mica, which imparts thereto the properties of self-lubrication and resistance to fire and heat which characterize that mineral.

In another application filed February 24, 1891, Serial No. 382,577, I have referred to the difficulties of combining mica with a mineral-binding agent, such as silicate of soda, and have described a compound in which these substances are caused to cohere and unite permanently under high pressure without baking by the addition of another mineral substance, such as talc free from lime.

The present invention is for a composition belonging to the same class, the distinguishing feature of which is the addition of sulphur. This element makes the compound harder, more dense, and refractory, and does not impair in any degree its utility as an electrical insulator.

In preparing the composition I prefer to use natural sulphur compounds, such as iron, copper, or antimony pyrites crushed or ground to a fine powder, though I may employ commercial flour of sulphur or a suitable sulphur compound other than those above mentioned. The use of sulphur in this composition is of great importance in adding to its cohesiveness, hardness, and durability. The composition prepared as herein described is very destinctive in its appearance and properties and of far greater utility than those prepared without sulphur. It is to be noted that this ingredient is not used for the purpose of curing or vulcanizing gums by the aid of heat, for which purpose it is generally used, there being no gummy or similar matters in my compositions and heat not being used to consolidate them.

The following is given as an example of a procedure which results in a useful composition. I mix together two parts, by weight, of powdered sulphur compound, such as indicated, fifty parts of finely-powdered mica, fifty parts of finely-divided asbestus, (or powdered feldspar,) and from three to ten parts of soluble glass, depending on the dryness of the mass. These ingredients, being thoroughly mixed, are molded under high pressure, as described in the aforesaid application. The composition is also preferably waterproofed, as therein described.

Substantially the same composition may be produced by using in place of pyrites oxides or chlorides of the metals specified with sulphur—say in the form of flour of sulphur. Mineral pigments may be also added as may be desired.

I claim—

The herein-described hard, dense, and refractory composition of matter having the property of resistance to heat and electricity and of being molded under high pressure without heat, said composition being composed of pulverized mica, silicate of soda, sulphur or sulphur compound, and another mineral substance, such as finely-divided asbestus.

In testimony whereof I have signed this specification in the presence of two subscribing witnesses.

SMITH W. KIMBLE.

Witnesses:
PHILIP MAURO,
JONA B. CILLEY.